US012430645B2

(12) United States Patent
Goel et al.

(10) Patent No.: US 12,430,645 B2
(45) Date of Patent: Sep. 30, 2025

(54) METHOD AND SYSTEM FOR AUTHORIZATION AND SETTLEMENT IN BLOCKCHAIN TRANSACTIONS

(71) Applicant: MASTERCARD INTERNATIONAL INCORPORATED, Purchase, NY (US)

(72) Inventors: Sidharth Goel, Kotkapura (IN); Ankur Sarwate, New Delhi (IN); Ayushi Jain, Jabalpur (IN); Chandan Garg, Haryana (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 290 days.

(21) Appl. No.: 17/512,048

(22) Filed: Oct. 27, 2021

(65) Prior Publication Data

US 2023/0131813 A1 Apr. 27, 2023

(51) Int. Cl.
*G06Q 20/40* (2012.01)
*G06Q 20/38* (2012.01)

(52) U.S. Cl.
CPC ....... *G06Q 20/401* (2013.01); *G06Q 20/3825* (2013.01); *G06Q 2220/00* (2013.01)

(58) Field of Classification Search
CPC ............ G06Q 20/401; G06Q 20/3825; G06Q 2220/00
See application file for complete search history.

(56) References Cited

U.S. PATENT DOCUMENTS 7,548,884 B1 * 6/2009 Thomas ............. G06Q 30/0623
705/38
10,354,236 B1 * 7/2019 Wang ................. G06Q 20/0658
(Continued)

FOREIGN PATENT DOCUMENTS

WO WO-2023037200 A1 * 3/2023

OTHER PUBLICATIONS

Vallois and F. A. Guenane, "Bitcoin transaction: From the creation to validation, a protocol overview," 2017 1st Cyber Security in Networking Conference (CSNet), Rio de Janeiro, Brazil, 2017, pp. 1-7.*
(Continued)

*Primary Examiner* — Steven S Kim
(74) *Attorney, Agent, or Firm* — Panitch Schwarze Belisario & Nadel LLP

(57) ABSTRACT

A method for expedited inclusion of pre-authorized blockchain transactions in new blocks. A blockchain node will utilize a traditional pending transaction pool of unconfirmed transactions, but will also utilize a new transaction pool that is comprised of pending blockchain transactions that have been confirmed, but have not yet been added to the blockchain. When a new block is being generated by a node, they can select pending transactions from the confirmed transaction pool and include them in the new block without repeating the confirmation process, which can save time and computing resources, thereby enabling the new block to be generated faster and increasing the chance that the new block will be the one that is validated and added to the chain. Additional rules and criteria can be applied to ensure that transactions that are in the confirmed transaction pool are added to a new block in a timely fashion.

16 Claims, 5 Drawing Sheets

(56) References Cited

U.S. PATENT DOCUMENTS

| | | | | |
|---|---|---|---|---|
| 11,336,457 | B2* | 5/2022 | Garg | H04L 63/12 |
| 11,468,411 | B2* | 10/2022 | Destefanis | G06Q 20/3825 |
| 11,727,366 | B1* | 8/2023 | Cutler | H04L 9/0637 |
| | | | | 705/65 |
| 2012/0209762 | A1* | 8/2012 | Metaireau | G06Q 20/10 |
| | | | | 705/39 |
| 2018/0247191 | A1* | 8/2018 | Katz | A63F 13/67 |
| 2019/0004789 | A1* | 1/2019 | Mills | H04L 9/3239 |
| 2019/0205886 | A1* | 7/2019 | Ramakrishnan | G06Q 20/10 |
| 2019/0278766 | A1* | 9/2019 | Xia | H04L 9/3236 |
| 2019/0303353 | A1* | 10/2019 | Letz | G06F 16/1834 |
| 2021/0099311 | A1* | 4/2021 | Saponaro | H04L 9/3297 |
| 2021/0105131 | A1* | 4/2021 | Garg | H04L 9/0825 |
| 2021/0383371 | A1* | 12/2021 | Chiu | G06Q 20/389 |
| 2022/0393871 | A1* | 12/2022 | Joseph | H04L 9/3226 |
| 2022/0405747 | A1* | 12/2022 | Coughlan | H04L 9/3239 |
| 2022/0407704 | A1* | 12/2022 | Chen | G07C 5/0841 |
| 2023/0093968 | A1* | 3/2023 | Park | H04L 67/10 |
| 2023/0128039 | A1* | 4/2023 | Kumawat | G06F 16/2379 |
| | | | | 707/822 |
| 2023/0162186 | A1* | 5/2023 | Coughlan | G06Q 20/389 |
| | | | | 705/75 |
| 2023/0196458 | A1* | 6/2023 | Friedman | G06Q 40/04 |
| | | | | 705/37 |
| 2023/0298009 | A1* | 9/2023 | Chen | G06Q 20/02 |
| | | | | 705/69 |
| 2023/0370285 | A1* | 11/2023 | Liu | H04L 9/50 |

OTHER PUBLICATIONS

D. Puthal, N. Malik, S. P. Mohanty, E. Kougianos and G. Das, "Everything You Wanted to Know About the Blockchain: Its Promise, Components, Processes, and Problems," in IEEE Consumer Electronics Magazine, vol. 7, No. 4, pp. 6-14, Jul. 2018.*

B. G. Gebraselase, B. E. Helvik and Y. Jiang, "An Analysis of Transaction Handling in Bitcoin," 2021 IEEE International Conference on Smart Data Services (SMDS), Chicago, IL, USA, 2021, pp. 162-172.*

A. Antonopoulos, "Mastering Bitcoin", O'Reilly Media, Inc., Dec. 2014.* https://freewallet.org/faq/what-are-blockchain-confirmations/.* https://wiki.bitcoinsv.io/index.php/Transaction_Pools, Jan. 2021.*

* cited by examiner

METHOD AND SYSTEM FOR AUTHORIZATION AND SETTLEMENT IN BLOCKCHAIN TRANSACTIONS

FIELD

The present disclosure relates to the authorization and settlement of blockchain transactions, specifically the use of multiple transaction pools of pending transactions to expedite the addition of transactions that have been confirmed and not yet included in a block in the blockchain.

BACKGROUND

Blockchain was initially created as a storage mechanism for use in conducting payment transactions with a cryptographic currency. Using a blockchain provides a number of benefits, such as decentralization, distributed computing, transparency regarding transactions, and yet also providing anonymity as to the individuals or entities involved in a transaction. One of the more popular aspects of a blockchain is that it is an immutable record: every transaction ever that is part of the chain is stored therein and cannot be changed due to the computational requirements and bandwidth limitations, particularly as a chain gets longer and a blockchain network adds more nodes.

However, while the immutability strengthens as the chain gets longer, the amount of time it takes for blockchain nodes to confirm a transaction can also increase. As each new transaction relies on a prior transaction, the further back the earlier transactions date, the more and more blocks must be examined and verified by the blockchain node, which can add significant time and resources to the process, which can also delay subsequent transactions as well. In some cases, a transaction may be confirmed by a blockchain node, but may not be included in a new block that is added to the blockchain, such as due to a block proposed by a different node being accepted by the blockchain network more quickly. In these cases, a transaction may remain pending for a significant period. In existing blockchain implementations, when a new block is being generated by a blockchain node, the node must first confirm each transaction being included in the new block, which can be a lengthy process depending on the age of the blockchain and number of transactions being included in the new block.

Thus, there may be instances where a pending blockchain transaction may be confirmed repeatedly before being added to the blockchain, resulting in a significant waste of computing resources and time. As such, there is a need for an improvement in the implementation of a blockchain that enables a transaction to be confirmed only once even in instances where the transaction may be added to the blockchain in a subsequent block.

SUMMARY

The present disclosure provides a description of systems and methods for expedited inclusion of pre-authorized blockchain transactions in new blocks. A blockchain node will utilize a traditional pending transaction pool of unconfirmed transactions, but will also utilize a new transaction pool that is comprised of pending blockchain transactions that have been confirmed, but have not yet been added to the blockchain. When a new block is being generated by a node, they can select pending transactions from the confirmed transaction pool and include them in the new block without repeating the confirmation process, which can save time and computing resources, thereby enabling the new block to be generated faster and increasing the chance that the new block will be the one that is validated and added to the chain. Additional rules and criteria can be applied to ensure that transactions that are in the confirmed transaction pool are added to a new block in a timely fashion, to ensure that no transaction remains pending for a significant length of time. For instance, a time limit may be set such that any pending transaction that has been pending beyond the time limit must be included in the next block that is added to the blockchain, and where any block proposed that does not include the transaction will be determined to be invalid by nodes in the chain. Using such rules and criteria can ensure that already-confirmed transactions are added to the blockchain more quickly and can also provide for faster processing of new blocks through being able to avoid repetitive transaction confirmations.

A method for expedited inclusion of pre-authorized blockchain transactions in new blocks includes: storing, in a memory of a blockchain node in a blockchain network, an unconfirmed transaction pool, a confirmed transaction pool, and a blockchain, the blockchain including a plurality of blocks, each block including a block header and one or more confirmed past transactions; receiving, by a receiver of the blockchain node in the blockchain network, an unconfirmed blockchain transaction, the unconfirmed blockchain transaction including at least a digital signature, an input transaction, one or more recipient addresses, and, for each of the one or more recipient addresses, a currency amount; confirming, by a processor of the blockchain node in the blockchain network, the unconfirmed blockchain transaction based on at least the digital signature, input transaction, one or more recipient addresses, and currency amount for each of the one or more recipient addresses and the one or more confirmed past transactions in one or more of the plurality of blocks included in the blockchain; receiving, by the receiver of the blockchain node in the blockchain network, a confirmed block, wherein the confirmed block includes one or more added blockchain transactions, wherein the one or more added blockchain transactions does not include the confirmed blockchain transaction; storing, by the processor of the blockchain node in the blockchain network, the confirmed blockchain transaction in the confirmed transaction pool; generating, by the processor of the blockchain node in the blockchain network, a new block, wherein the new block includes a new header and at least one new blockchain transaction, the at least one new blockchain transaction including the confirmed blockchain transaction; and transmitting, by a transmitter of the blockchain node in the blockchain network, the generated new block to a plurality of additional nodes in the blockchain network.

A system for expedited inclusion of pre-authorized blockchain transactions in new blocks includes: a blockchain network; a plurality of additional nodes included in the blockchain network; and a blockchain node in the blockchain network including a memory storing an unconfirmed transaction pool, a confirmed transaction pool, and a blockchain, the blockchain including a plurality of blocks, each block including a block header and one or more confirmed past transactions, a receiver receiving an unconfirmed blockchain transaction, the unconfirmed blockchain transaction including at least a digital signature, an input transaction, one or more recipient addresses, and, for each of the one or more recipient addresses, a currency amount, a processor confirming the unconfirmed blockchain transaction based on at least the digital signature, input transaction, one or more recipient addresses, and currency amount for each of the one or more recipient addresses and the one or more confirmed past transactions in one or more of the plurality of blocks included in the blockchain, and a transmitter, wherein the receiver of the blockchain node further receives a confirmed block, wherein the confirmed block includes one or more added blockchain transactions, wherein the one or more added blockchain transactions does not include the confirmed blockchain transaction, the processor of the blockchain node further stores the confirmed blockchain transaction in the confirmed transaction pool, and generates a new block, wherein the new block includes a new header and at least one new blockchain transaction, the at least one new blockchain transaction including the confirmed blockchain transaction, and the transmitter of the blockchain node transmits the generated new block to a plurality of additional nodes in the blockchain network.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Expedited Inclusion of Pre-Authorized Blockchain Transactions

Figure 1:
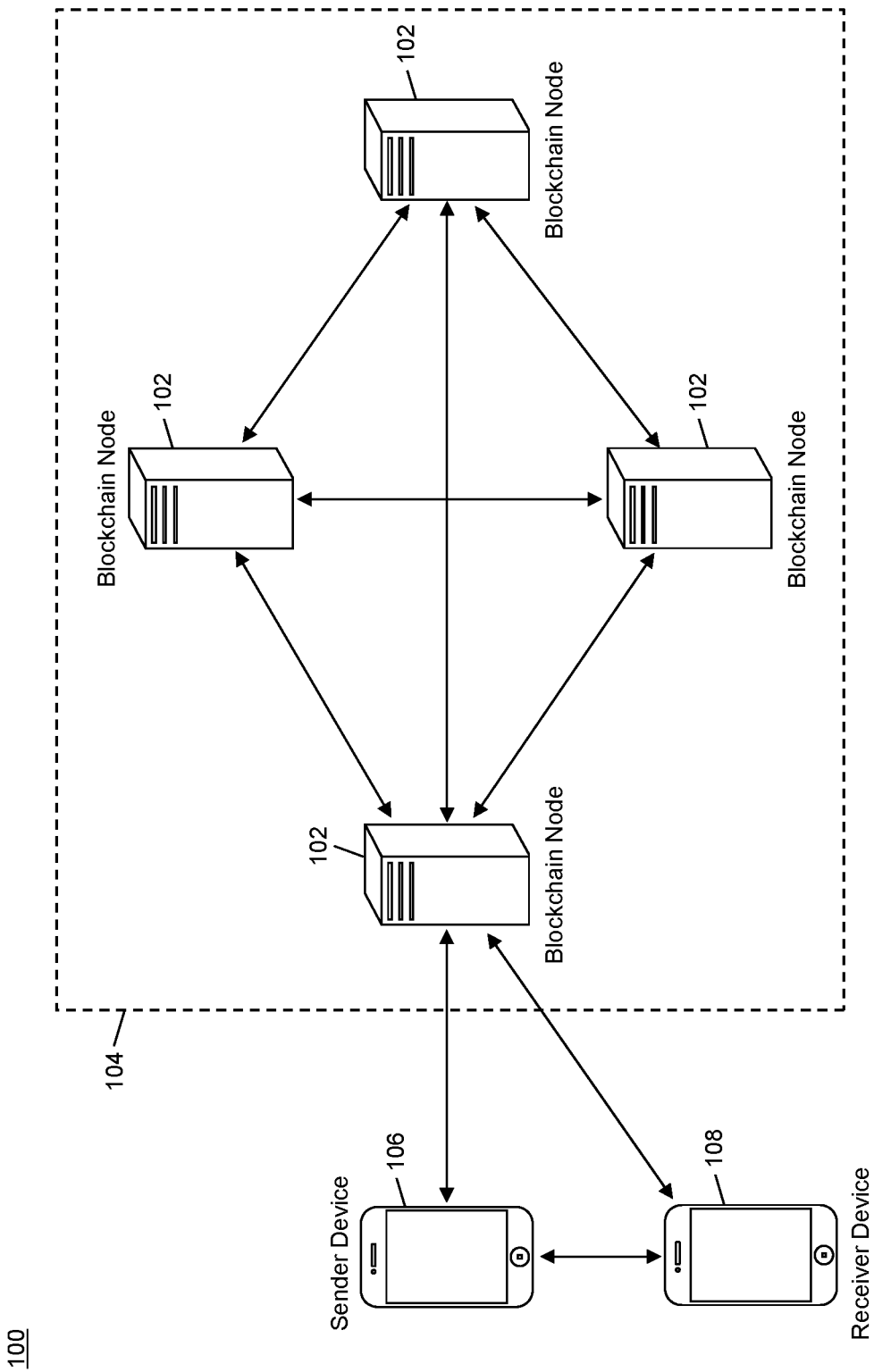
FIG. 1 is a block diagram illustrating a high level system architecture for processing blockchain transactions using multiple transaction pools and transaction pre-authorization in accordance with exemplary embodiments.

FIG. 1 illustrates a system 100 for expedited inclusion of pre-authorized blockchain transactions in new blocks.

Figure 2:
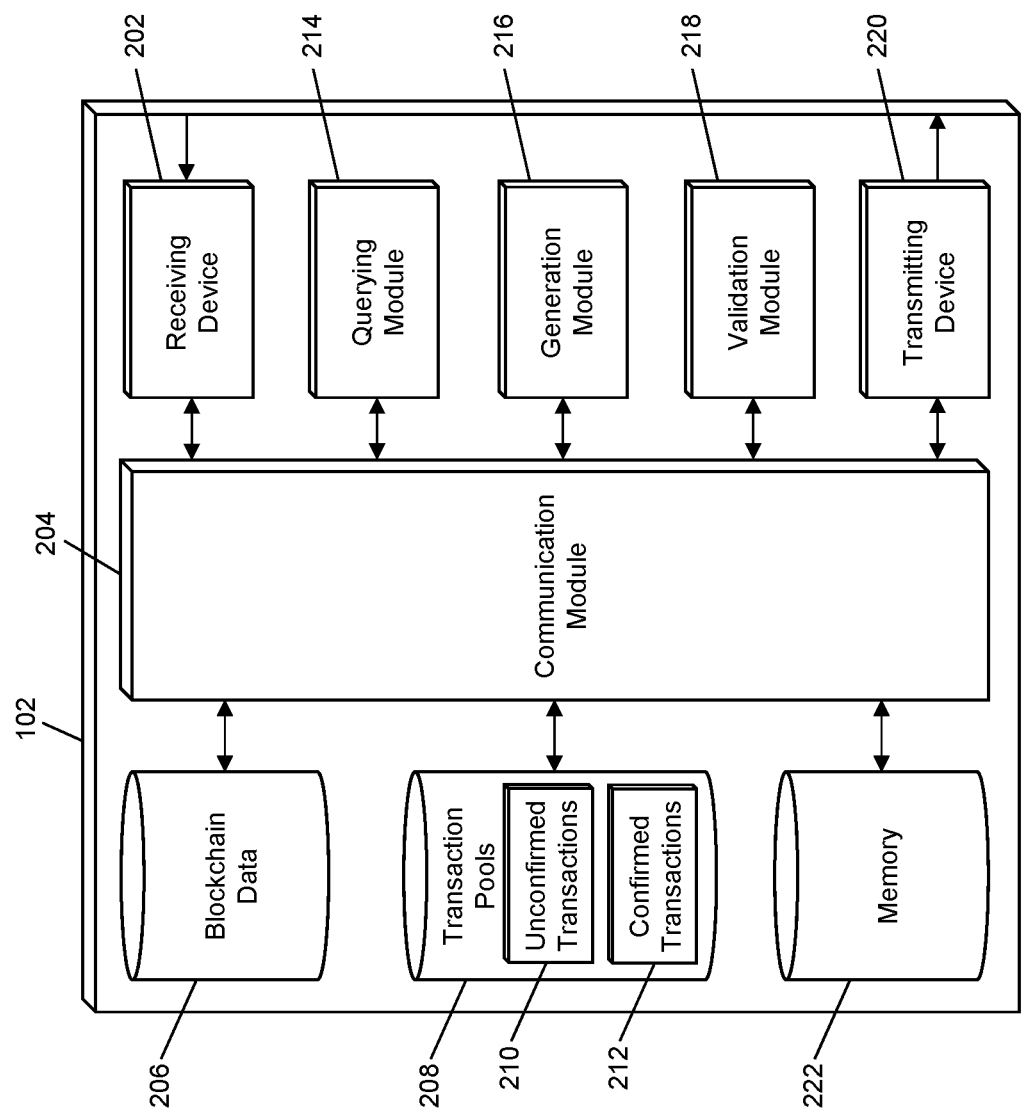
FIG. 2 is a block diagram illustrating a blockchain node of the system of FIG. 1 for processing blockchain transactions using multiple transaction pools and transaction pre-authorization in accordance with exemplary embodiments.
Figure 5:
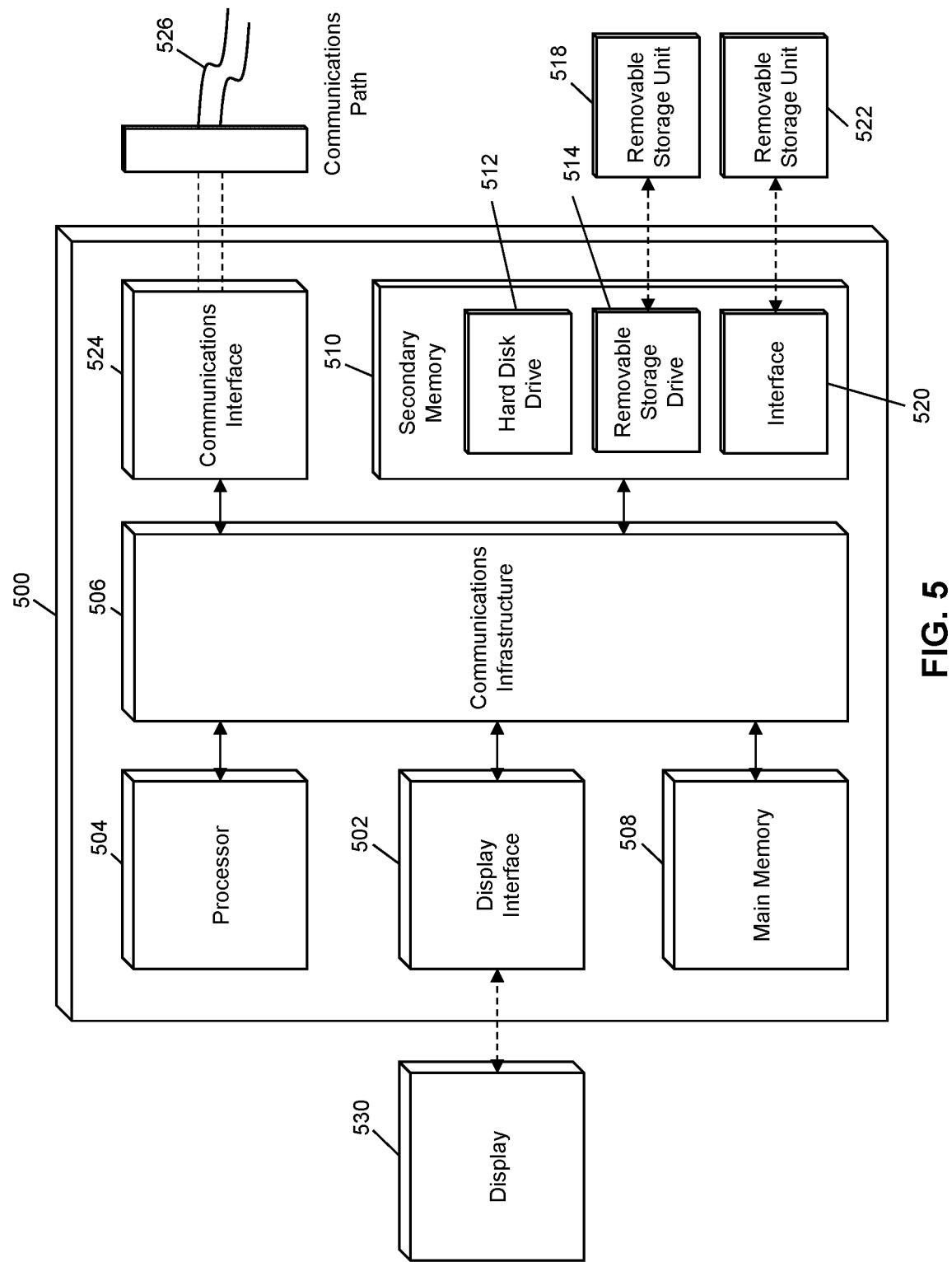
FIG. 5 is a block diagram illustrating a computer system architecture in accordance with exemplary embodiments.

The system 100 may include a blockchain network 104. The blockchain network 104 may be comprised of a plurality of blockchain nodes 102. Each blockchain node 102 may be a computing system, such as illustrated in FIGS. 2 and 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain.

The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single blockchain node 102 in the blockchain network 104 prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a computing device (e.g., sender device 106 and receiver device 108) that stores the private key for use thereof in blockchain transactions. For instance, each computing device may each have their own private key for respective cryptographic key pairs, and may each be a blockchain wallet for use in transactions with the blockchain associated with the blockchain network. Computing devices may be any type of device suitable to store and utilize a blockchain wallet, such as a desktop computer, laptop computer, notebook computer, tablet computer, cellular phone, smart phone, smart watch, smart television, wearable computing device, implantable computing device, etc.

Each blockchain data value stored in the blockchain may correspond to a blockchain transaction or other storage of data, as applicable. A blockchain transaction may consist of at least: a digital signature of the sender of currency (e.g., a sender device 106) that is generated using the sender's private key, a blockchain address of the recipient of currency (e.g., a receiver device 108) generated using the recipient's public key, and a blockchain currency amount that is transferred or other data being stored. In some blockchain transactions, the transaction may also include one or more blockchain addresses of the sender where blockchain currency is currently stored (e.g., where the digital signature proves their access to such currency), as well as an address generated using the sender's public key for any change that is to be retained by the sender. Addresses to which cryptographic currency has been sent that can be used in future transactions are referred to as "output" addresses, as each address was previously used to capture output of a prior blockchain transaction, also referred to as "unspent transactions," due to there being currency sent to the address in a prior transaction where that currency is still unspent. In some cases, a blockchain transaction may also include the sender's public key, for use by an entity in validating the transaction. For the traditional processing of a blockchain transaction, such data may be provided to a blockchain node 102 in the blockchain network 104, either by the sender or the recipient. The node may verify the digital signature using the public key in the cryptographic key pair of the sender's wallet and also verify the sender's access to the funds (e.g., that the unspent transactions have not yet been spent and were sent to address associated with the sender's wallet), a process known as "confirmation" of a transaction, and then include the blockchain transaction in a new block. The new block may be validated by other nodes in the blockchain network 104 before being added to the blockchain and distributed to all of the blockchain nodes 102 in the blockchain network 104 in traditional blockchain implementations. In cases where a blockchain data value may not be related to a blockchain transaction, but instead the storage of other types of data, blockchain data values may still include or otherwise involve the validation of a digital signature.

When a new blockchain transaction is submitted to a blockchain node 102 by a sender device 106, the transaction may be stored in a pool of pending transactions. The blockchain transactions that are submitted and included in this pool may be distributed to other blockchain nodes 102 in the blockchain network 104, where each blockchain node 102 may be free to select the transaction as one of the blockchain transactions included in a new block that is generated by that blockchain node 102 and proposed for addition to the blockchain. In a traditional blockchain network 104, there may be a single pool of pending transactions. In such systems, when blockchain transactions are selected from the pool for inclusion in a new block, the blockchain node 102 that selects the transactions must confirm each of the transactions. Confirmation of a transaction may include validation of the digital signature using a public key, ensuring there are suitable funds for transfer to the appropriate addresses, etc., as discussed above. In some instances where a transaction may be selected, confirmed, and included in a new block that is being generated by the blockchain node 102, a different new block may be proposed by a different blockchain node 102 that is validated and accepted by a majority of the blockchain nodes 102 in the blockchain network 104. In such instances, the selected transaction may remain in the pending transaction pool for selection for a different, later block to be added to the blockchain. In such cases, the transaction will be confirmed again once selected by a blockchain node 102 for a different block.

In the system 100, each blockchain node 102 may include a pending transaction pool for all new blockchain transactions that are received that have not been confirmed, referred to herein as an "unconfirmed transaction pool" or a "legacy transaction pool," and may also include a second pool for blockchain transactions that have been confirmed, but have not yet been included in a block added to the blockchain, referred to herein as a "confirmed transaction pool," an "authorized transaction pool," or a "pre-authorized transaction pool." In instances, such as the above, where a blockchain node 102 confirmed a blockchain transaction but a new block being generated thereby is not accepted as the next block to be added to the chain, the confirmed transaction may be moved from the unconfirmed transaction pool to the confirmed transaction pool.

In some embodiments, transaction pools may be unique to each blockchain node 102 in the blockchain network 104. For instance, each blockchain node 102 may maintain its own transaction pools where a blockchain node 102 that confirms a pending blockchain transaction that is not included in a new block added to the blockchain may move that transaction to the confirmed transaction pool, while that pending transaction may remain in the unconfirmed transaction pool for other blockchain nodes 102. In other embodiments, the movement of pending blockchain transactions from the unconfirmed transaction pool to the confirmed transaction pool may be broadcast to other blockchain nodes 102 in the blockchain network 104, such as using the same mechanism as the distribution of new blockchain transactions that are submitted to the blockchain network 104.

When a blockchain node 102 in the blockchain network 104 is generating a new block, they may select pending blockchain transactions from either transaction pool. Any pending transactions selected from the unconfirmed transaction pool must be confirmed prior to attempted generation of the new block, while pending transactions selected from the confirmed transaction pool may be selected without any confirmation being performed due to the pre-authorized status of the transaction. In some embodiments, a separate confirmation process may be performed for transactions in the confirmed transaction pool, such as a streamlined or minimized process. For example, the unspent transaction output may be checked for transactions in the confirmed transaction pool to ensure that the unspent transaction output has not already been spent, but digital signature validation and currency amount checks may not be performed, which may still provide for a significant decrease in processing time.

The blockchain node 102 may generate a new block using traditional methods and systems once each of the selected transactions have been confirmed (e.g., as necessary depending on the pool(s) from where the transactions were selected). For instance, the blockchain node 102 may generate a Merkle root using the pending blockchain transactions selected and may attempt to identify a nonce that, when the block header for the new block is hashed with the nonce included, the resulting hash value satisfies a predetermined rule or criteria, such as having a specified number of leading zeroes. When a new block is generated that satisfies any applicable rules, it may be transmitted to other blockchain nodes 102 in the blockchain network 104 for confirmation using traditional methods and systems. If a blockchain node 102 submits a new block for confirmation, but a different block is confirmed by a majority of the blockchain nodes 102 in the blockchain network, the blockchain node 102 may check the blockchain transactions that are included in that different block to see if any of the pending transactions confirmed by the blockchain node 102 were not included. The blockchain node 102 may then move any such transactions that are identified into the confirmed transaction pool, if not already included in that pool.

In some embodiments, there may be rules or other criteria set for the transaction pools. For instance, a time limit may be imposed such that a pending transaction that is in the confirmed transaction pool must be included in the next block added to the blockchain after the time limit. For example, a sixty minute time limit may be set to ensure that every transaction is added to the blockchain within an hour. Such a limit may be enforced by a blockchain node 102 refusing to approve or confirm any proposed block that does not include any pending transactions where the limit has been met or exceeded. Other such criteria may include, for instance, a number of transactions, a currency value, a number of blocks, etc. For example, if more than 50 transactions have been added to the confirmed transaction pool, the blockchain node 102 may only select transactions from the confirmed transaction pool for a new block, or may refuse to confirm any block that would not reduce the number of transactions in the confirmed transaction pool to below a predetermined value. In another example, if a pending transaction is submitted or confirmed, there may be a requirement that the transaction is added to the blockchain within a predetermined number of blocks, where any block beyond the predetermined number may not be confirmed if it does not include the pending transaction. Such criteria may be used to ensure that every blockchain transaction submitted to the blockchain network 104 is confirmed and added to the blockchain in a timely fashion.

In some cases, if blockchain nodes 102 share transaction pools, the rules or criteria may be adjusted accordingly. For instance, if confirmed transactions are shared across the blockchain nodes 102 (e.g., if one blockchain node 102 confirms a transaction that is not included in the next block, the confirmation of the transaction may be distributed across the blockchain network 104), a confirmed transaction may only be moved to the confirmed transaction pool if a majority of blockchain nodes 102 had confirmed that transaction, such as using a process similar to confirmation of a new block. In some instances, the portion of blockchain nodes 102 required to have confirmed the pending blockchain transaction may vary, such as may only be a third or quarter of the blockchain nodes 102.

The systems and methods discussed herein utilize multiple transaction pools to enable pre-authorization of blockchain transactions, which can facilitate faster generation of new blocks and inclusion of pending blockchain transactions in a blockchain. For instance, a blockchain node 102 may confirm ten transactions that are not added to the next block in the blockchain. That blockchain node 102 may then generate a new block using only the pre-authorized transactions from its confirmed transaction pool, which enables the blockchain node 102 to generate the new block faster by skipping all transaction confirmations (e.g., or using faster confirmations as discussed above). This gives that new block a greater chance to be confirmed and added to the blockchain as other blocks that include pending, unconfirmed transactions. Thus, pre-authorized blockchain transactions will be added to the blockchain faster than unconfirmed transactions. Any other blockchain nodes 102 that were generating new blocks with unconfirmed transactions will have confirmed those transactions, which may themselves have a greater chance for inclusion in subsequent blocks. As a result, blocks may be generated and confirmed more quickly, resulting in an overall increase in speed for the blockchain and reducing the amount of processing by blockchain nodes, while also ensuring that transactions are added to the blockchain more quickly than in prior blockchain implementations.

Blockchain Node

FIG. 2 illustrates an embodiment of the blockchain node 102 in the system 100. It will be apparent to persons having skill in the relevant art that the embodiment of the blockchain node 102 illustrated in FIG. 2 is provided as illustration only and may not be exhaustive to all possible configurations of the blockchain node 102 suitable for performing the functions as discussed herein. For example, the computer system 500 illustrated in FIG. 5 and discussed in more detail below may be a suitable configuration of the blockchain node 102.

The blockchain node 102 may include a receiving device 202. The receiving device 202 may be configured to receive data over one or more networks via one or more network protocols. In some instances, the receiving device 202 may be configured to receive data from other blockchain nodes 102, sender devices 106, receiver devices 108, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by other blockchain nodes 102 that may be superimposed or otherwise encoded with new transactions for confirmation, confirmed blockchain transactions, new blocks for confirmation, confirmed blocks for addition to the blockchain, messages regarding block confirmations, blockchain hash values, etc. The receiving device 202 may also be configured to receive data signals electronically transmitted by sender devices 106 and/or receiver devices 108, which may be superimposed or otherwise encoded with new blockchain transactions, public keys, digital signatures, etc.

The blockchain node 102 may also include a communication module 204. The communication module 204 may be configured to transmit data between modules, engines, databases, memories, and other components of the blockchain node 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the blockchain node 102 and external components of the blockchain node 102, such as externally connected databases, display devices, input devices, etc. The blockchain node 102 may also include a processing device. The processing device may be configured to perform the functions of the blockchain node 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, validation module 218, etc. As used herein, the term "module" may be hardware programmed by software or hardware otherwise particularly programmed to receive an input, perform one or more processes using the input, and provides an output. The input, output, and processes performed by various modules will be apparent to one skilled in the art based upon the present disclosure.

The blockchain node 102 may also include blockchain data 206, which may be stored in a memory 222 of the blockchain node 102 or stored in a separate area within the blockchain node 102 or accessible thereby. The blockchain data 206 may include a blockchain, which may be comprised of a plurality of blocks and be associated with the blockchain network 104. In some cases, the blockchain data 206 may further include any other data associated with the blockchain and management and performance thereof, such as block generation algorithms, digital signature generation and confirmation algorithms, communication data for blockchain nodes 102, etc. The blockchain data 206 may also include rules or criteria for managing transaction pools and the inclusion or authorization of transactions stored therein.

The blockchain node 102 may include transaction pools 208. As discussed above, a blockchain node 102 may include an unconfirmed transaction pool 210 and a confirmed transaction pool 212. Pending blockchain transactions that have not been confirmed or included in the blockchain may be stored in the unconfirmed transaction pool 210. The confirmed transaction pool 212 may include pending blockchain transactions that have been confirmed by the blockchain node 102, but which have not yet been included in a block in the blockchain. In some embodiments, the transaction pools 208 may be specific to the blockchain node 102. In other embodiments, the pending transactions stored in each of the transaction pools 208 may be the same across blockchain nodes 102 or a subset of blockchain nodes 102 in the blockchain network 104. In some cases, the transaction pools 208 may also include additional data for any transactions stored therein, such as data regarding the date of addition of a pending blockchain transaction to the respective transaction pool, number of blocks added since the addition of the pending blockchain transaction, total number of transactions being stored, or any other data that may be used by the blockchain node 102 in ensuring compliance with any applicable rules or criteria. In some instances, such data may be stored in the transaction pools 208 or may be stored in the blockchain data 206 or memory 222 of the blockchain node 102.

The blockchain node 102 may also include a memory 222. The memory 222 may be configured to store data for use by the blockchain node 102 in performing the functions discussed herein, such as public and private keys, symmetric keys, etc. The memory 222 may be configured to store data using suitable data formatting methods and schema and may be any suitable type of memory, such as read-only memory, random access memory, etc. The memory 222 may include, for example, encryption keys and algorithms, communication protocols and standards, data formatting standards and protocols, program code for modules and application programs of the processing device, and other data that may be suitable for use by the blockchain node 102 in the performance of the functions disclosed herein as will be apparent to persons having skill in the relevant art. In some embodiments, the memory 222 may be comprised of or may otherwise include a relational database that utilizes structured query language for the storage, identification, modifying, updating, accessing, etc. of structured data sets stored therein. The memory 222 may be configured to store, for example, cryptographic keys, salts, nonces, communication information for blockchain nodes 102 and blockchain networks 104, address generation and validation algorithms, digital signature generation and validation algorithms, hashing algorithms for generating reference values, rules regarding generation of new blocks and block headers, hash values, rules and criteria regarding transaction pools 208 and confirmed transaction pools 212, etc.

The blockchain node 102 may include a querying module 214. The querying module 214 may be configured to execute queries on databases to identify information. The querying module 214 may receive one or more data values or query strings and may execute a query string based thereon on an indicated database, such as the memory 222 of the blockchain node 102 to identify information stored therein. The querying module 214 may then output the identified information to an appropriate engine or module of the blockchain node 102 as necessary. The querying module 214 may, for example, execute a query on unconfirmed transaction pool 210 to transfer a pending blockchain transaction that was confirmed by the blockchain node 102 into the confirmed transaction pool 212.

The blockchain node 102 may also include a generation module 216. The generation module 216 may be configured to generate data for use by the blockchain node 102 in performing the functions discussed herein. The generation module 216 may receive instructions as input, may generate data based on the instructions, and may output the generated data to one or more modules of the blockchain node 102. For example, the generation module 216 may be configured to generate new blockchain data values, new block headers, Merkle roots, new blocks, and other data for operation of the blockchain.

The blockchain node 102 may also include a validation module 218. The validation module 218 may be configured to perform validations for the blockchain node 102 as part of the functions discussed herein. The validation module 218 may receive instructions as input, which may also include data to be used in performing a validation, may perform a validation as requested, and may output a result of the validation to another module or engine of the blockchain node 102. The validation module 218 may, for example, be configured to confirm blockchain transactions by analyzing blockchain data values in the blockchain to ensure that the sender device 106 is authorized to use the transaction outputs included in the new transaction submission and that the transaction outputs have not been previously used to transfer currency in another transaction. Such transactions may be moved from the unconfirmed transaction pool 210 to the confirmed transaction pool 212 if the confirmed blockchain transaction is not included in the next block added to the blockchain. The validation module 218 may also be configured to validate digital signatures using public keys and suitable signature generation algorithms, as well as to validate hash values for user-based blockchain ledgers as discussed above.

The blockchain node 102 may also include a transmitting device 220. The transmitting device 220 may be configured to transmit data over one or more networks via one or more network protocols. In some instances, the transmitting device 220 may be configured to transmit data to other blockchain nodes 102, sender devices 106, receiver devices 108, and other entities via one or more communication methods, local area networks, wireless area networks, cellular communication, Bluetooth, radio frequency, the Internet, etc. In some embodiments, the transmitting device 220 may be comprised of multiple devices, such as different transmitting devices for transmitting data over different networks, such as a first transmitting device for transmitting data over a local area network and a second transmitting device for transmitting data via the Internet. The transmitting device 220 may electronically transmit data signals that have data superimposed that may be parsed by a receiving computing device. In some instances, the transmitting device 220 may include one or more modules for superimposing, encoding, or otherwise formatting data into data signals suitable for transmission.

The transmitting device 220 may be configured to electronically transmit data signals to blockchain nodes 102 that are superimposed or otherwise encoded with new blockchain data values, new blocks for confirmation, confirmed blocks, messages regarding block or transaction confirmations, hash values, and other data used in the operation and management of the blockchain. The transmitting device 220 may also be configured to electronically transmit data signals to sender devices 106 and/or receiver devices 108, which may be superimposed or otherwise encoded with confirmation requests, notifications regarding transaction processing, etc.

Blockchain Processing Including Transaction Pre-Authorization

Figure 3:
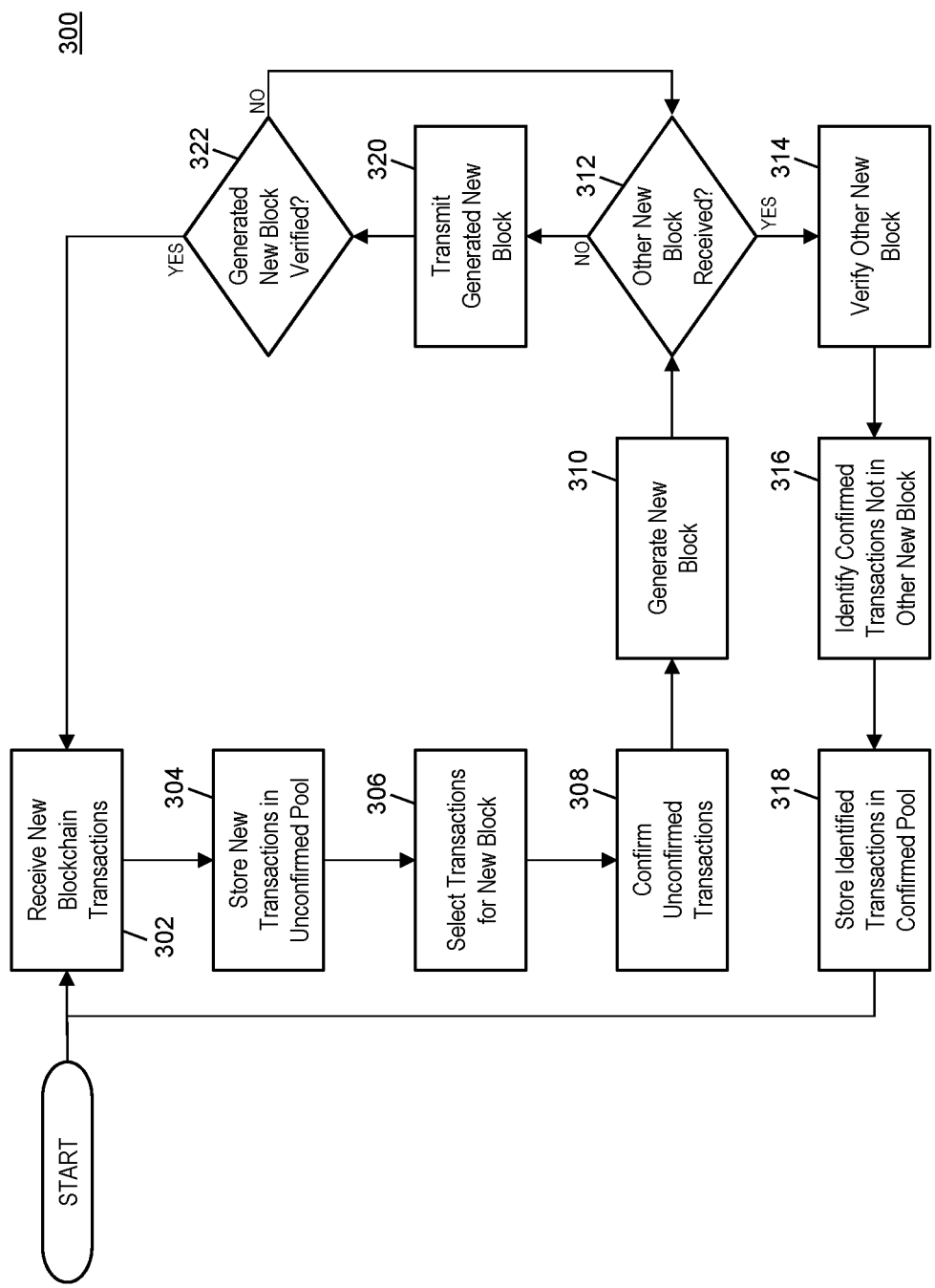
FIG. 3 is a flow diagram illustrating a process for expedited processing of blockchain transactions using pre-authorization in accordance with exemplary embodiments.

FIG. 3 illustrates a process 300 executed by a blockchain node 102 in the blockchain network 104 for the processing of new blockchain transactions and blocks in the blockchain network 104 where transactions can be pre-authorized as discussed above.

In step 302, the receiving device 202 of the blockchain node 102 may receive new blockchain transactions, such as from sender devices 106. The new blockchain transactions may be pending transactions that have not yet been confirmed by the blockchain node 102. In step 304, the querying module 214 of the blockchain node 102 may execute a query on the unconfirmed transaction pool 210 of the blockchain node 102 for storage of the received new, unconfirmed blockchain transactions therein. In step 306, the blockchain node 102 may select one or more pending blockchain transactions for inclusion in a new block to be generated thereby. Pending blockchain transactions may be selected from either transaction pool, the unconfirmed transaction pool 210 or confirmed transaction pool 212. In some cases, the blockchain node 102 may select pending transactions in accordance with any applicable rules and criteria, such as to ensure that no transaction remains in the unconfirmed transaction pool 210 or confirmed transaction pool 212 beyond a predetermined period of time.

In step 308, the validation module 218 of the blockchain node 102 may confirm any pending blockchain transactions that were selected from the unconfirmed transaction pool. Confirmation of a pending blockchain transaction may include validation of the digital signature, verification that the unspent transaction output remains unspent, verification that the currency amount(s) being transferred does not exceed the amount attributed to the unspent transaction output, etc. In some cases, a streamlined or minimized confirmation may be performed for transactions selected from the confirmed transaction pool, such as ensuring that the unspent transaction output remains unspent. In step 310, the generation module 216 of the blockchain node 102 may generate a new block, where the new block includes a block header and the selected, now-confirmed pending blockchain transactions. The block header may include a timestamp, a reference hash value, and a hash value generated using the confirmed, pending blockchain transactions included in the new block.

In step 312, the blockchain node 102 may check to see if a different block has been confirmed prior to the confirmation of the new block being generated by the blockchain node 102. The check may be performed based on the receipt of any new blocks and/or confirmations regarding such a block. In some cases, the receipt of a new block and confirmation thereof by the blockchain node 102 may be performed concurrently with steps in the process 300. For instance, while the blockchain node 102 is generating a new block, the blockchain node 102 may also be attempting to confirm a different block received by the receiving device 202 from another blockchain node 102 in the blockchain network 104. If a different block is received by the blockchain node 102 prior to transmission and confirmation of its own block, then, in step 314, the validation module 218 may verify (e.g., confirm) the block, such as by checking its reference hash value and the block hash value, such as by generating a Merkle root using the blockchain transactions included in the block and comparing it with the block hash value included in the block header.

In step 316, the blockchain node 102 may identify any transactions that were confirmed by the validation module 218 in step 308 that are not included in the blockchain transactions in the verified other new block. In step 318, the querying module 214 of the blockchain node 102 may execute one or more queries to move the identified transactions from the unconfirmed transaction pool 210 to the confirmed transaction pool 212, as applicable. In some cases, if there are any transactions already in the confirmed transaction pool 212 that are identified in step 316, counters or other data may be updated accordingly, such as for compliance with any applicable rules or criteria (e.g., to ensure such a transaction is added to the blockchain within a predetermined number of blocks). The process 300 may then restart for the next block to be generated and added to the blockchain.

If, in step 312, a new block has not yet been received by the blockchain node 102 after generating its own new block, then, in step 320, the transmitting device 220 of the blockchain node 102 may electronically transmit its new block to a plurality of additional blockchain nodes 102 in the blockchain network 104. In step 322, the blockchain node 102 may wait to see if the new block it transmitted is verified, such as by awaiting receipt of confirmation messages by the receiving device 202 of the blockchain node 102. The process for confirmation of a new block may utilize traditional methods and systems of blockchain networks 104. If the new block is not successfully verified, or another, different block is verified ahead of the new block, then the process 300 may return to step 312 where the blockchain node 102 will receive that new block for verification and addition to the blockchain. If, in step 312, the new block is successfully verified and added to the blockchain, then the process 300 may restart for the next block to be generated and added to the blockchain.

Figure 4:
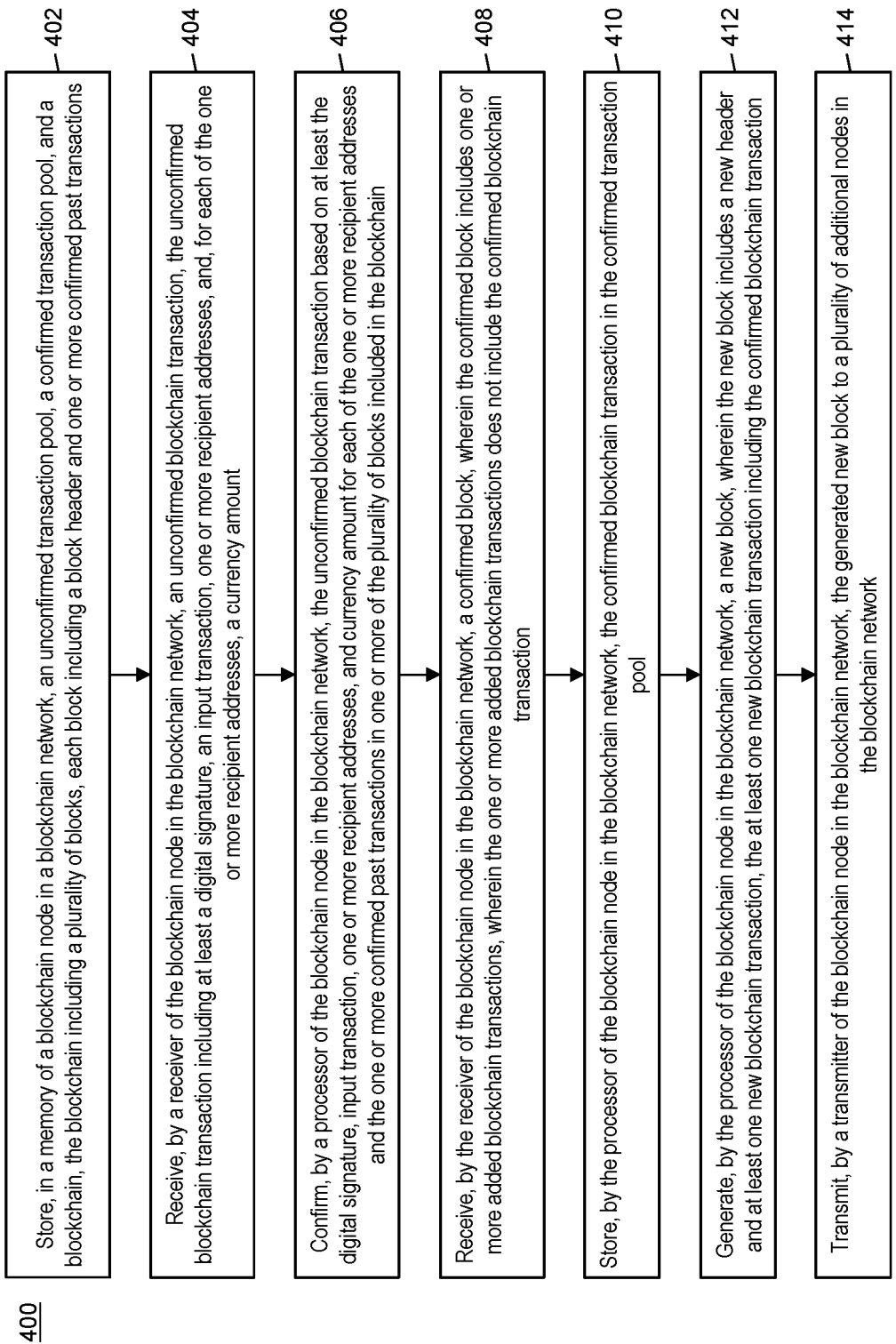
FIG. 4 is a flow chart illustrating an exemplary method for expedited inclusion of pre-authorized blockchain transactions in new blocks in accordance with exemplary embodiments.

Exemplary Method for Expedited Inclusion of Pre-Authorized Blockchain Transactions FIG. 4 illustrates a method 400 for the expedited inclusion of pre-authorized blockchain transactions in a blockchain through the use of multiple transaction pools and the ability for pre-authorization of a pending blockchain transaction.

In step 402, an unconfirmed transaction pool (e.g., unconfirmed transaction pool 210), a confirmed transaction pool (e.g., confirmed transaction pool 212), and a blockchain may be stored in a memory (e.g., memory 222) of a blockchain node (e.g., blockchain node 102) in a blockchain network (e.g., blockchain network 104), the blockchain including a plurality of blocks, each block including a block header and one or more confirmed past transactions. In step 404, an unconfirmed blockchain transaction may be received by a receiver (e.g., receiving device 202) of the blockchain node in the blockchain network, the unconfirmed blockchain transaction including at least a digital signature, an input transaction, one or more recipient addresses, and, for each of the one or more recipient addresses, a currency amount. In step 406, the unconfirmed blockchain transaction may be confirmed by a processor (e.g., validation module 218) of the blockchain node in the blockchain network based on at least the digital signature, input transaction, one or more recipient addresses, and currency amount for each of the one or more recipient addresses and the one or more confirmed past transactions in one or more of the plurality of blocks included in the blockchain.

In step 408, a confirmed block may be received by the receiver of the blockchain node in the blockchain network, wherein the confirmed block includes one or more added blockchain transactions, wherein the one or more added blockchain transactions does not include the confirmed blockchain transaction. In step 410, the confirmed blockchain transaction may be stored by the processor (e.g., querying module 214) of the blockchain node in the blockchain network in the confirmed transaction pool. In step 412, a new block may be generated by the processor (e.g., generation module 216) of the blockchain node in the blockchain network, wherein the new block includes a new header and at least one new blockchain transaction, the at least one new blockchain transaction including the confirmed blockchain transaction. In step 414, the generated new block may be transmitted by a transmitter (e.g., transmitting device 220) of the blockchain node in the blockchain network to a plurality of additional nodes in the blockchain network.

In one embodiment, the processor of the blockchain node may generate the new block without confirming the confirmed blockchain transaction. In some embodiments, the method 400 may further include receiving, by the receiver of the blockchain node in the blockchain network, a confirmation message for the new block from a majority of the additional nodes in the blockchain network. In one embodiment, the confirmed blockchain transaction may be included in the at least one new blockchain transaction if one or more predefined criteria is satisfied. In some embodiments, the new block may be rejected by each of the additional nodes in the blockchain network if the at least one new blockchain transaction does not satisfy one or more predefined criteria.

In one embodiment, the at least one new blockchain transaction may further include a plurality of additional transactions. In a further embodiment, the plurality of additional transactions may be stored in the unconfirmed transaction pool, and generating the new block may include confirming, by the processor of the blockchain node, each of the additional transactions in the plurality of additional transactions. In another further embodiment, the plurality of additional transactions may be stored in the confirmed transaction pool, and the processor of the blockchain node may generate the new block without confirming each of the plurality of additional transactions.

Computer System Architecture

FIG. 5 illustrates a computer system 500 in which embodiments of the present disclosure, or portions thereof, may be implemented as computer-readable code. For example, the blockchain nodes 102 of FIGS. 1 and 2 may be implemented in the computer system 500 using hardware, non-transitory computer readable media having instructions stored thereon, or a combination thereof and may be implemented in one or more computer systems or other processing systems. Hardware may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for expedited inclusion of pre-authorized blockchain transactions in new blocks. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for expedited inclusion of pre-authorized blockchain transactions in new blocks, comprising:
   storing, in a memory of each blockchain node of a plurality of blockchain nodes in a blockchain network, an unconfirmed transaction pool, a confirmed transaction pool, and a blockchain, wherein (i) the unconfirmed transaction pool in each respective blockchain node is a pending transaction pool that includes new blockchain transactions that have not yet been confirmed, and (ii) the confirmed transaction pool in each respective blockchain node includes blockchain transactions that have been validated but have not yet been included in a block added to the blockchain;
   receiving, by a receiver of a blockchain node in the blockchain network, an unconfirmed blockchain transaction from a sender device, the unconfirmed blockchain transaction including at least (i) a digital signature, (ii) an input transaction, (iii) one or more recipient addresses, and (iv) for each of the one or more recipient addresses, a transaction output including a currency amount;
   validating, by a processor of the blockchain node in the blockchain network, the unconfirmed blockchain transaction by at least (i) validating the digital signature using a public key and a signature generation algorithm, and (ii) verifying the currency amount for each of the one or more recipient addresses, wherein validating the unconfirmed blockchain transaction is further based on (iii) the input transaction, (iv) the one or more recipient addresses, and (v) one or more validated past transactions in one or more of a plurality of blocks included in the blockchain of the blockchain node;
   determining, by the processor of the blockchain node in the blockchain network, that the validated blockchain transaction is not already included in another block newly added to the blockchain;
   in response to determining that the validated blockchain transaction is not already included in another block newly added to the blockchain, storing, by the processor of the blockchain node in the blockchain network, the validated blockchain transaction in the confirmed transaction pool of the blockchain node along with a plurality of other validated blockchain transactions, wherein each validated transaction remains in the confirmed transaction pool for a predetermined period of time at which point the processor selects validated transactions for addition to the blockchain, ensuring that no transaction remains in the confirmation transaction pool beyond the predetermined period of time;
   upon expiration of the predetermined period of time, selecting, by the processor of the blockchain node, the validated blockchain transaction for addition to a new block;
   generating, by the processor of the blockchain node in the blockchain network, the new block, wherein the new block includes a new header and at least one new blockchain transaction, the at least one new blockchain transaction including the validated blockchain transaction; and
   transmitting, by a transmitter of the blockchain node in the blockchain network, the generated new block to a plurality of additional nodes in the blockchain network.

2. The method of claim 1, wherein the processor of the blockchain node generates the new block without validating the validated blockchain transaction.

3. The method of claim 1, wherein the at least one new blockchain transaction further includes a plurality of additional transactions.

4. The method of claim 3, wherein
   the plurality of additional transactions is stored in the unconfirmed transaction pool, and
   generating the new block includes validating, by the processor of the blockchain node, each of the additional transactions in the plurality of additional transactions.

5. The method of claim 3, wherein
   the plurality of additional transactions is stored in the confirmed transaction pool, and
   the processor of the blockchain node generates the new block without validating each of the plurality of additional transactions.

6. The method of claim 1, further comprising:
   receiving, by the receiver of the blockchain node in the blockchain network, a confirmation message for the new block from a majority of the additional nodes in the blockchain network.

7. The method of claim 1, wherein the validated blockchain transaction is included in the at least one new blockchain transaction if one or more predefined criteria is satisfied.

8. The method of claim 1, wherein the new block is rejected by each of the additional nodes in the blockchain network if the at least one new blockchain transaction does not satisfy one or more predefined criteria.

9. A system for expedited inclusion of pre-authorized blockchain transactions in new blocks, comprising:
   a blockchain network;
   a plurality of nodes included in the blockchain network, wherein each node of the plurality of nodes includes a memory storing an unconfirmed transaction pool, a confirmed transaction pool, and a blockchain, wherein (i) the unconfirmed transaction pool in each respective blockchain node is a pending transaction pool that includes new blockchain transactions that have not yet been confirmed, and (ii) the confirmed transaction pool in each respective blockchain node includes blockchain transactions that have been validated but have not yet been included in a block added to the blockchain,
   wherein a blockchain node of the plurality of blockchain nodes includes
      a receiver receiving an unconfirmed blockchain transaction from a sender device, the unconfirmed blockchain transaction including at least (i) a digital signature, (ii) an input transaction, (iii) one or more recipient addresses, and (iv) for each of the one or more recipient addresses, a transaction output including a currency amount, a processor
    validating the unconfirmed blockchain transaction by at least (i) validating the digital signature using a public key and a signature generation algorithm, and (ii) verifying the currency amount for each of the one or more recipient addresses, wherein validating the unconfirmed blockchain transaction is further based on (iii) the input transaction, (iv) the one or more recipient addresses, and (v) one or more validated past transactions in one or more of a plurality of blocks included in the blockchain of the blockchain node, and
    determining, by the processor of the blockchain node in the blockchain network, that the validated blockchain transaction is not already included in another block newly added to the blockchain, and
a transmitter, wherein
the processor of the blockchain node further
    stores, in response to determining that the validated blockchain transaction is not already included in another block newly added to the blockchain, the validated blockchain transaction in the confirmed transaction pool of the blockchain node along with a plurality of other validated blockchain transactions, wherein each validated transaction remains in the confirmed transaction pool for a predetermined period of time at which point the processor selects validated transactions for addition to the blockchain, ensuring that no transaction remains in the confirmation transaction pool beyond the predetermined period of time,
    selects, upon expiration of the predetermined period of time, the validated blockchain transaction for addition to a new block; and
    generates the new block, wherein the new block includes a new header and at least one new blockchain transaction, the at least one new blockchain transaction including the validated blockchain transaction, and
    the transmitter of the blockchain node transmits the generated new block to a plurality of additional nodes in the blockchain network.

10. The system of claim 9, wherein the processor of the blockchain node generates the new block without validating the validated blockchain transaction.

11. The system of claim 9, wherein the at least one new blockchain transaction further includes a plurality of additional transactions.

12. The system of claim 11, wherein
    the plurality of additional transactions is stored in the unconfirmed transaction pool, and
    generating the new block includes validating, by the processor of the blockchain node, each of the additional transactions in the plurality of additional transactions.

13. The system of claim 11, wherein
    the plurality of additional transactions is stored in the confirmed transaction pool, and
    the processor of the blockchain node generates the new block without validating each of the plurality of additional transactions.

14. The system of claim 9, wherein the receiver of the blockchain node in the blockchain network further receives a confirmation message for the new block from a majority of the additional nodes in the blockchain network.

15. The system of claim 9, wherein the validated blockchain transaction is included in the at least one new blockchain transaction if one or more predefined criteria is satisfied.

16. The system of claim 9, wherein the new block is rejected by each of the additional nodes in the blockchain network if the at least one new blockchain transaction does not satisfy one or more predefined criteria.

* * * * *